(12) United States Patent
Lee

(10) Patent No.: US 8,194,645 B2
(45) Date of Patent: Jun. 5, 2012

(54) SYSTEM FOR BLIND/ATTENDED TRANSFER IN SESSION INITIATION PROTOCOL (SIP)-BASED NETWORK AND METHOD OF CONTROLLING THE TRANSFER

(75) Inventor: Joo-Hong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1361 days.

(21) Appl. No.: 11/826,359

(22) Filed: Jul. 13, 2007

(65) Prior Publication Data

US 2008/0175229 A1 Jul. 24, 2008

(30) Foreign Application Priority Data

Jan. 19, 2007 (KR) .................. 10-2007-0006110

(51) Int. Cl.
 *H04L 12/66* (2006.01)
(52) U.S. Cl. .................... 370/352; 370/252; 379/212.01
(58) Field of Classification Search .................. None
 See application file for complete search history.

(56) References Cited

U.S. PATENT DOCUMENTS

| 2006/0067300 | A1* | 3/2006 | Poustchi et al. | 370/352 |
| 2008/0192733 | A1* | 8/2008 | Song et al. | 370/352 |
| 2009/0036107 | A1* | 2/2009 | Wen et al. | 455/415 |

* cited by examiner

*Primary Examiner* — Duc C Ho

(74) *Attorney, Agent, or Firm* — H.C. Park & Associates, PLC

(57) ABSTRACT

A method for controlling blind/attended transfer in an SIP-based network includes: transmitting, by an SIP-based terminal, a call request message to a third terminal, which is an object of a call transfer, after pausing a communication with a second terminal by transmitting a call waiting message to the SIP server; determining, by the SIP-based terminal, whether a call transfer function (Hook on) has been activated prior to receiving a call response (200OK) signal from the SIP server; and performing, by the SIP-based terminal, the blind transfer with the third terminal by transmitting a call transfer message (REFER) to the SIP server upon the call transfer function (Hook on) being activated prior to receiving the call response message from the SIP server. The SIP-based terminal processes the blind/attended transfer using one input, thereby providing convenience to a user.

16 Claims, 9 Drawing Sheets

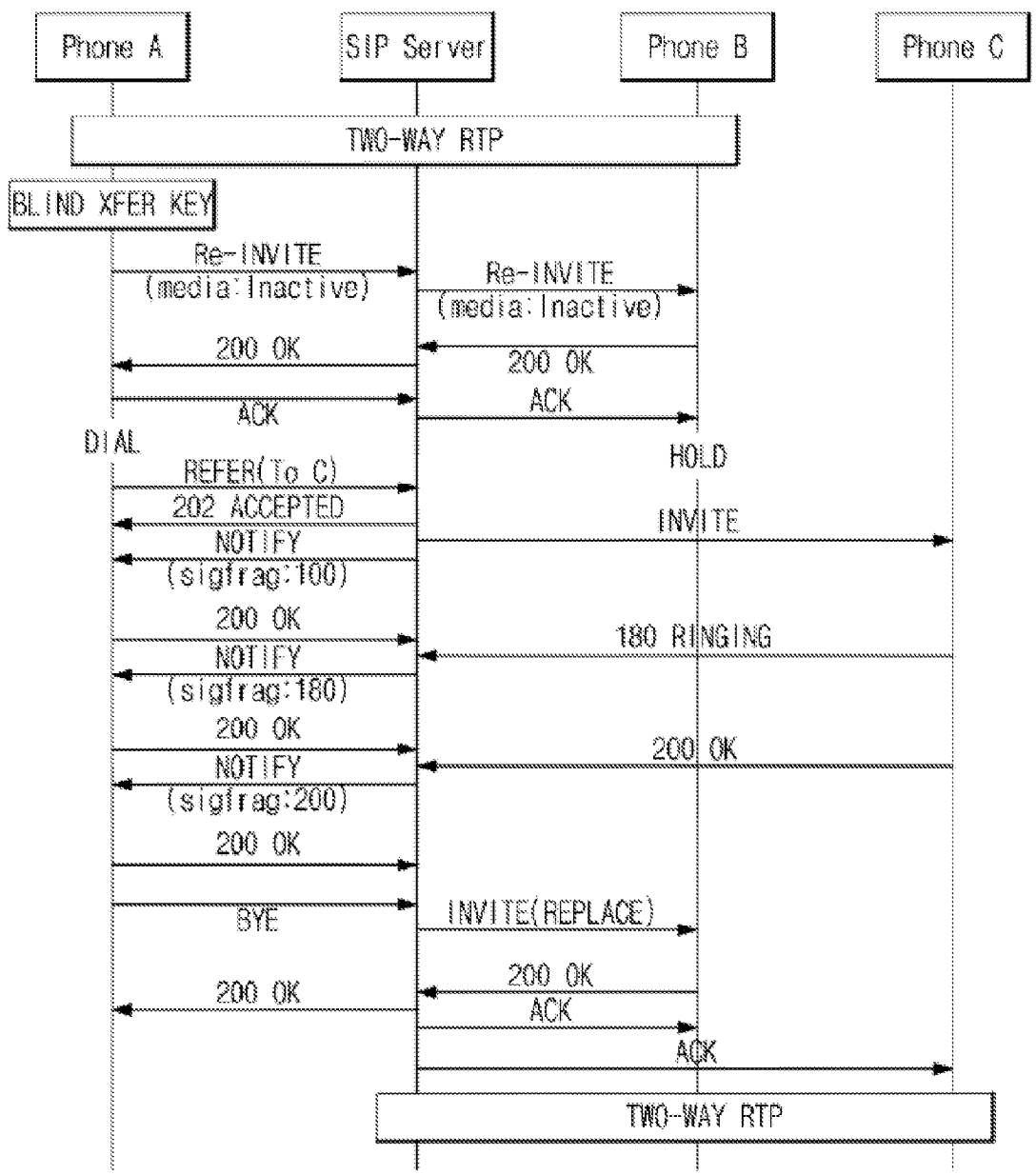

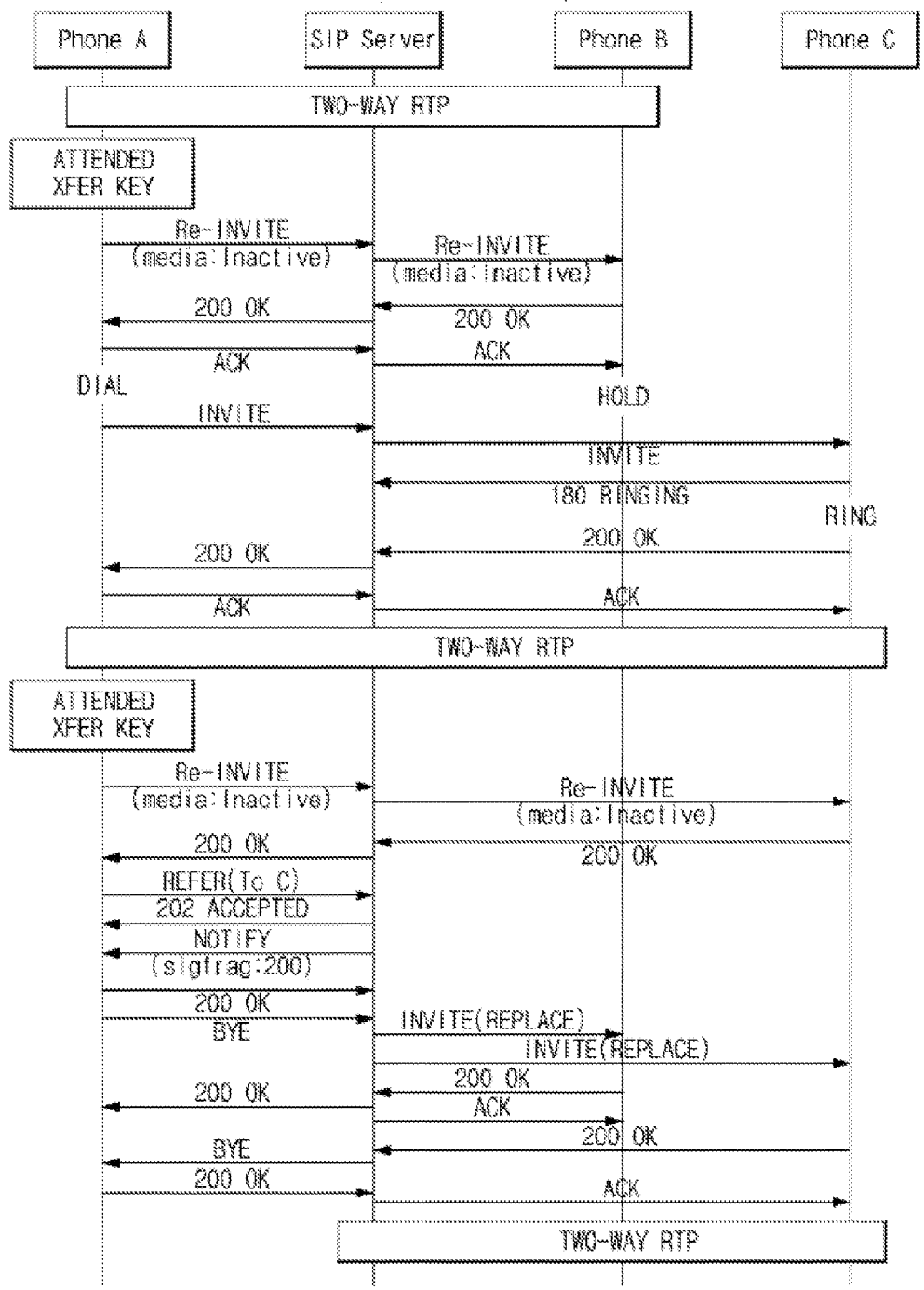

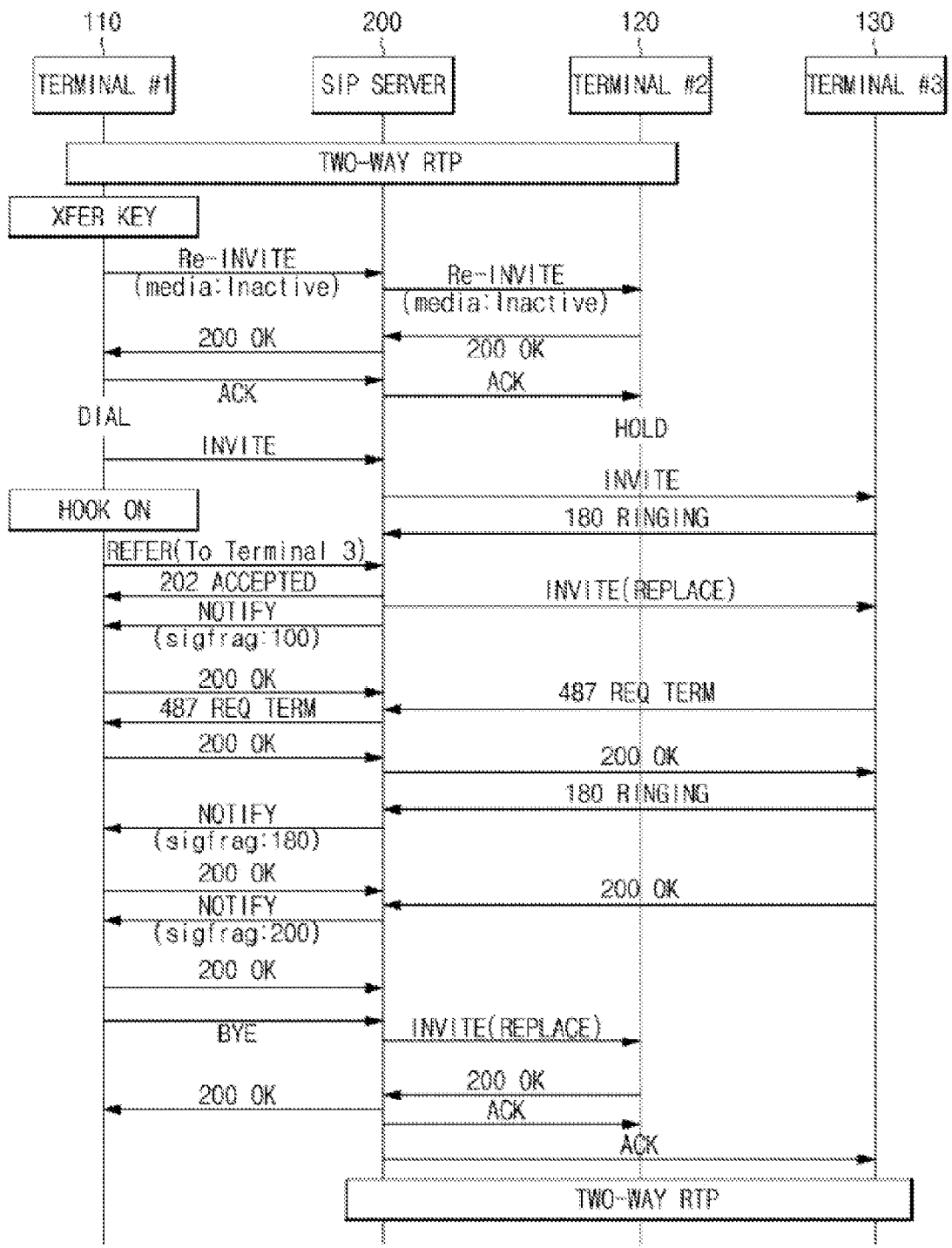

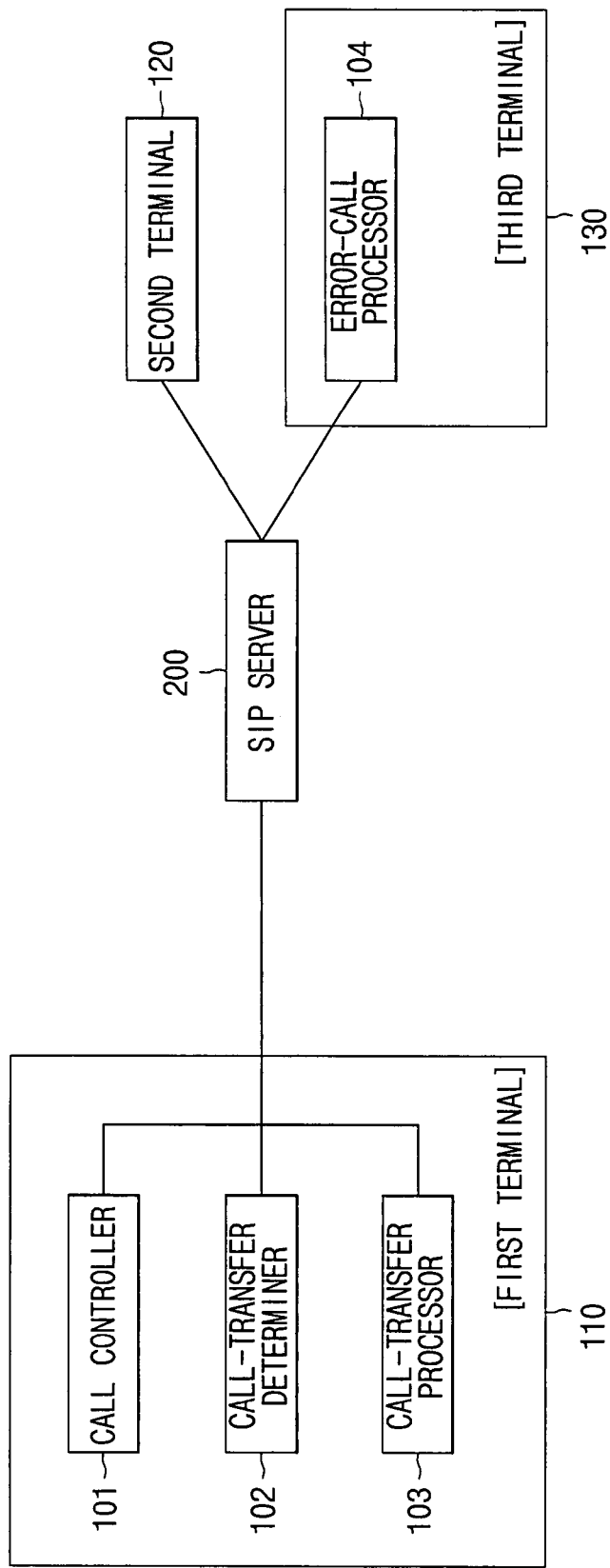

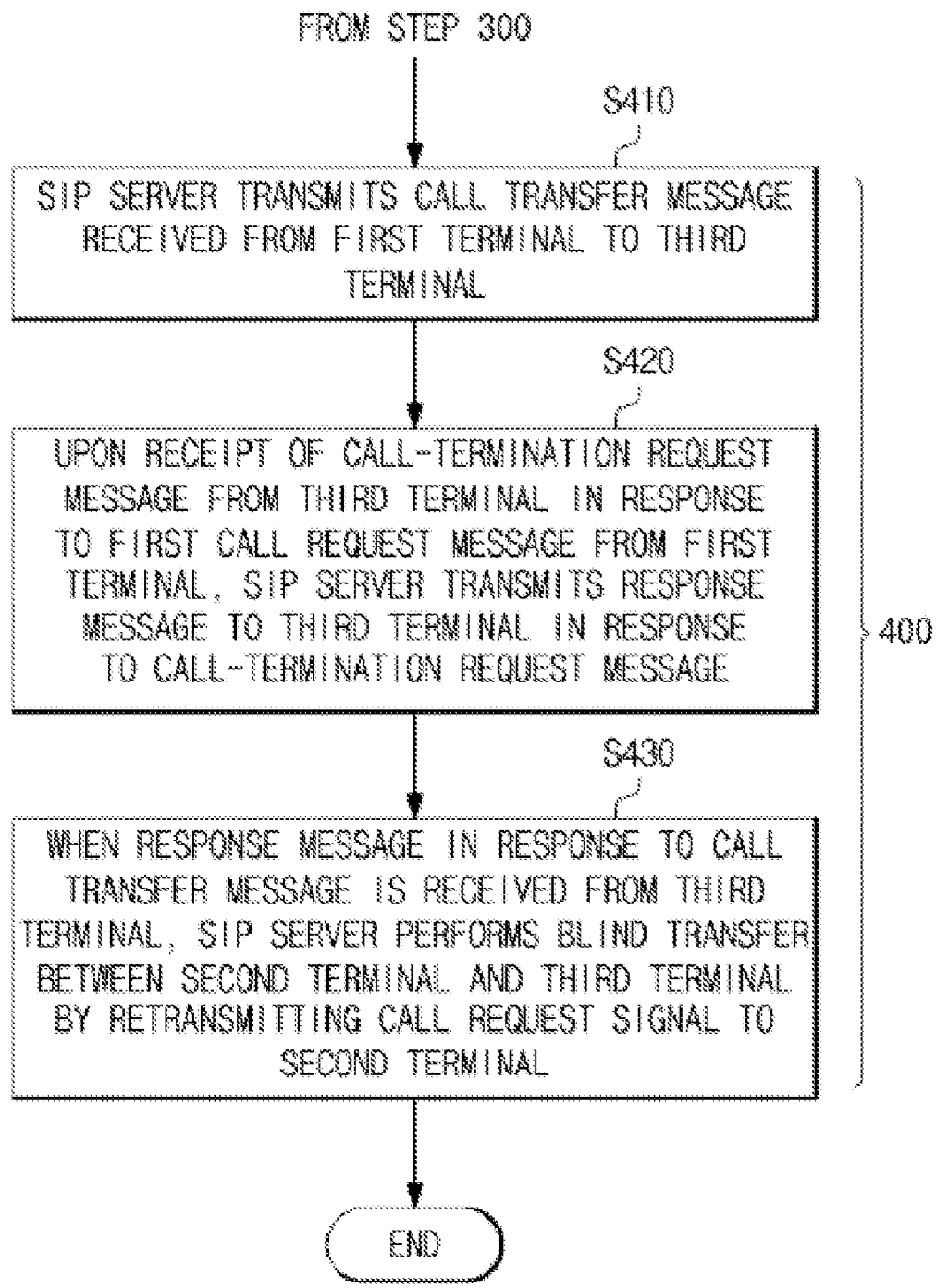

SYSTEM FOR BLIND/ATTENDED TRANSFER IN SESSION INITIATION PROTOCOL (SIP)-BASED NETWORK AND METHOD OF CONTROLLING THE TRANSFER

CLAIM OF PRIORITY

This application makes reference to, incorporates the same herein, and claims all benefits accruing under 35 U.S.C.§119 from an application for SYSTEM FOR BLIND/ATTENDED TRANSFER IN SIP-BASED NETWORK AND METHOD FOR CONTROLLING THE TRANSFER earlier filed in the Korean Intellectual Property Office on the 19$^{th}$ of January 2007 and there duly assigned Serial No. 10-2007-0006110.

BACKGROUND OF THE INVENTION

1. Field of the Invention

The present invention relates to a system for blind/attended transfer in a Session Initiation Protocol (SIP)-based network and a method of controlling the transfer.

2. Description of the Related Art

In a conventional Session Initiation Protocol (SIP)-based network, a blind transfer refers to transferring a call from a terminal B to a terminal C irrespective of reception of the terminal C when a terminal A, communicating with the terminal B, attempts to transfer the call to connect the terminal B with the terminal C, as shown in FIG. 1A.

An attended transfer refers to transferring a call from a terminal B to a terminal C after making a connection with the terminal C when a terminal A, communicating with the terminal B, attempts to transfer the call to connect the terminal B with the terminal C, as shown in FIG. 1B.

In a Public Switched Telephone Network (PSTN), a switch differentiates the two transfer schemes for call processing based on a hook flash signal and a hook on signal from a user. On the other hand, in an SIP-based network, a terminal differentiates the two transfer schemes for call processing since a server performs only processing associated with a message received from the terminal.

Since the two transfer schemes use a different call processing method, the terminal needs to have separate menus or buttons selected by a user to support the transfer schemes. However, a general terminal provides a soft menu so that the call transfer is performed only when a user selects the menu. The soft menu is displayed as a list of menus on a Liquid Crystal Display (LCD) screen, and one in the list is selected by a user pressing a corresponding button while scrolling.

The use of the soft menu to select the two transfer schemes is a tedious task to a user. The two transfer schemes cannot be provided by a terminal having no soft menu.

SUMMARY OF THE INVENTION

It is an object of the present invention to provide a system for blind/attended transfer in a Session Initiation Protocol (SIP)-based network and a method of controlling the transfer in which the blind/attended transfer are processed using one input when an IP phone, used in a home or a business and based on the SIP protocol, transfers a call during communication.

A first aspect of the present invention provides a method of controlling a blind/attended transfer in an SIP-based network, wherein a first SIP-based terminal communicating with a second terminal through an SIP server transfers a call to a third terminal, the method including: transmitting, by the first SIP-based terminal, a call request message to the third terminal, which is an object of the call transfer, after pausing a communication with the second terminal by transmitting a call waiting message to the SIP server; determining, by the first SIP-based terminal, whether a call transfer function (Hook on) has been activated prior to receiving a call response (200OK) signal from the SIP server; and performing, by the first SIP-based terminal, the blind transfer with the third terminal by transmitting a call transfer message (REFER) to the SIP server upon the call transfer function (Hook on) being activated prior to receiving the call response message from the SIP server.

The method may further include: when the call transfer function (Hook on) is activated after establishing a call in response to the call response message from the SIP server, performing, by the first SIP-based terminal, the attended transfer with the third terminal by transmitting the call waiting message of the third terminal to the SIP server.

The method may further include: determining, by the first SIP-based terminal, whether the call transfer message has been received after receiving the call request message from the SIP server and before transmitting the call response message; and when the call transfer message has been received prior to transmitting the call response message, terminating, by the SIP-based terminal, a call established by a first call request message by transmitting a call-termination request message associated with the first call request message to the SIP server, and simultaneously generating a ring-tone in response to the call transfer message.

A second aspect of the present invention provides a method of controlling a call transfer to a third terminal when a first terminal and a second terminal, which are SIP based, are communicating through an SIP server, the method including: when a call waiting message for pausing a call of the second terminal has been received from the first terminal, pausing, by the SIP server, the call of the second terminal by transmitting the call waiting message to the second terminal; when a call request message for a call of the third terminal has been received from the first terminal, transmitting, by the SIP server, the call request message to the third terminal; determining, by the SIP server, whether a call transfer message has been received from the first terminal prior to receiving a call response message from the third terminal; and performing, by the SIP server, the blind transfer by transmitting the call request message to the second terminal and the third terminal when a call transfer message has been received from the first terminal prior to receiving a call response message from the third terminal.

The method may further include: when a call transfer message has been not received from the first terminal prior to receiving a call response message from the third terminal, determining, by the SIP server, whether the call waiting message of the third terminal has been received from the first terminal after establishing the call of the third terminal with the first terminal in response to the call response message from the third terminal; and when the call waiting message of the third terminal has been received, performing, by the SIP server, the attended transfer in response to the call transfer message from the first terminal after pausing the third terminal, which establishes a call with the first terminal.

The step of performing, by the SIP server, the blind transfer by transmitting the call request message to the second terminal and the third terminal may include: transmitting, by the SIP server, the call transfer message received from the first terminal to the third terminal; transmitting, by the SIP server, a response message to a call-termination request message to the third terminal, after receiving the call-termination request message in response to the first call request message transmitted from the first terminal; and performing, by the SIP server, the blind transfer between the second terminal and the third terminal by retransmitting a call request signal to the second terminal if the SIP server has received a response message to the call transfer message from the third terminal.

A third aspect of the present invention provides a system for a blind/attended transfer in an SIP-based network in which call transfer to a third terminal is facilitated when a first terminal and a second terminal, which are SIP based, are communicating through an SIP server, the system including: the first terminal transmitting a call request message to the SIP server to establish a call with the third terminal that is a transfer object, after pausing a call with the second terminal by transmitting a call waiting message to the SIP server when a call waiting function has been activated, the first terminal determining whether the call transfer message has been received prior to receiving the call response message in response to the call request message from the SIP server, and performing the blind transfer with the third terminal by transmitting the call transfer message to the SIP server when the call transfer message has been received prior to receiving the call response message; the SIP server performing a call waiting procedure after transmitting the call waiting message to the second terminal when the SIP server receives the call waiting message from the first terminal, and transmitting the call request message to the third terminal when the SIP server receives the call request message from the first terminal after pausing the second terminal, the SIP server transmitting a call re-request message to the third terminal when the SIP server receives the call transfer message from the first terminal prior to receiving the call response message from the third terminal, and performing the blind transfer with the third terminal after terminating the call requested by the first terminal in response to a call-termination request message in response to the call request message from the third terminal after; and the third terminal transmitting the call-termination request message in response to the call request message of the first terminal, to the SIP server if the third terminal receives the call transfer message of the first terminal after receiving the call request message of the first terminal, and performing the blind transfer by transmitting the call response message to the SIP server in response to the call request message of the first terminal.

The first terminal may determine whether the call transfer function has been activated after the second terminal has been put in a waiting state and the call with the third terminal has been established. The first terminal may put the second terminal in a waiting state and performs the attended transfer by transmitting a call waiting signal to the SIP server to put the third terminal in a waiting state when the call transfer function has been activated after the second terminal has been put in a waiting state and the call with the third terminal has been established.

The call waiting function and the call transfer function may be performed by the same processor or respective independent processors.

A fourth aspect of the present invention provides an SIP-based terminal performing a blind/attended transfer to a third terminal while communicating with a second terminal in an SIP-based network, the terminal including: a call controller for transmitting a call request message to the third terminal, which is a transfer object, after pausing a call with the second terminal by transmitting a call waiting message to an SIP server when a call waiting function has been activated; a call-transfer determiner for determining whether a call transfer function (Hook on) has been activated prior to receiving a call response message (200OK) from the SIP server; and a call-transfer processor for performing the blind transfer with the third terminal by transmitting a call-transfer request message (REFER) to the SIP server for the blind transfer to the third terminal, when the call transfer function has been activated prior to receiving a call response message (200OK) from the SIP server.

The call-transfer processor may transmit the call waiting message to the SIP server in order to perform the attended transfer to the third terminal, when the call transfer message has been received after a call has been established in response to the call response message from the SIP server, and perform the attended transfer by retransmitting the call request message to the second terminal and the third terminal The call-transfer processor may terminate a call generated by a first call request message by transmitting a call-termination request message in response to the first call request message, when the call transfer message has been received prior to transmitting the call response message, and the terminal may further include an error-call processor for generating a ring-tone for the call transfer message.

The call waiting function and the call transfer function may be performed by the same processor or respective independent processors.

BRIEF DESCRIPTION OF THE DRAWINGS

A more complete appreciation of the present invention, and many of the attendant advantages thereof, will be readily apparent as the present invention becomes better understood through reference to the following detailed description when considered in conjunction with the accompanying drawings, in which like reference symbols indicate the same or similar components, wherein:

FIG. 1A is a signal flow diagram of a blind transfer system in an SIP-based IP network system;

FIG. 1B is a signal flow diagram of an attended transfer system in an SIP-based IP network system;

FIG. 2A is a signal flow diagram of a blind transfer system in an SIP-based network system of an embodiment of the present invention;

FIG. 3 is a block diagram of a system for blind/attended transfer in an SIP-based network of an embodiment of the present invention;

FIG. 7 is a flowchart of a detailed operation of a blind transfer step (S400) in a method of controlling a blind/attended transfer of an SIP server in an SIP-based network of an embodiment of the present invention.

DETAILED DESCRIPTION OF THE INVENTION

Hereinafter, exemplary embodiments of the present invention are described in detail with reference to the accompanying drawings. For the sake of clarity and conciseness, matters related to the present invention that are well known in the art have not been described.

Figure 2B:
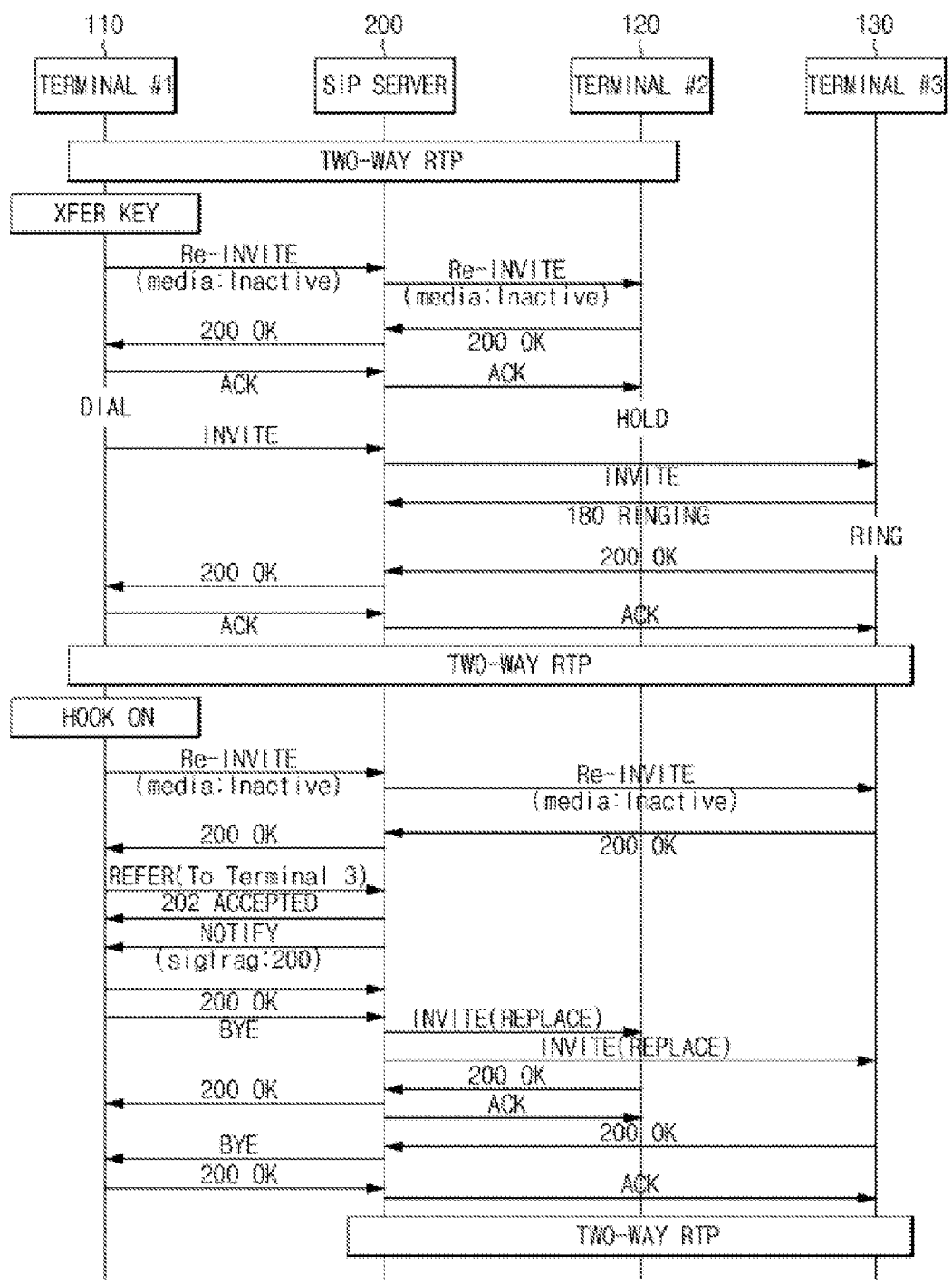
FIG. 2B is a signal flow diagram of an attended transfer system in an SIP-based network system of an embodiment of the present invention.

FIG. 2A and FIG. 2B are signal flow diagrams of a system for blind/attended transfer in an SIP-based network of an embodiment of the present invention. The system includes a first terminal 110, a second terminal 120, a third terminal 130, and an SIP server 200.

The first terminal 110 places a call with the second communicating terminal 120 in a waiting state by transmitting a call waiting message to the SIP server 200 when a call transfer function has been activated while establishing a call with the second terminal 120, and transmits a call request message to the SIP server 200 to establish a call with the third terminal 130. The first terminal 110 determines whether a call transfer message has been received prior to receiving a call response message in response to the call request message from the SIP server 200. When a call transfer function has been activated prior to receiving a call response message, the first terminal 110 performs a blind transfer with the third terminal by transmitting a call transfer message to the SIP server 200. The first terminal 110 also determines whether the call transfer function has been activated after the second terminal 120 has been placed in a waiting state and a call with the third terminal 130 has been established. When the call transfer function has been activated after the second terminal 120 has been placed in a waiting state and the call with the third terminal 130 has been established, the first terminal 110 performs an attended transfer by transmitting a call waiting signal to the SIP server 200 for pausing the third terminal 130.

When the call waiting message has been received from the first terminal 110, the SIP server 200 transmits the call waiting message to the second terminal 120 and then performs a call waiting procedure. When the second terminal 120 has been placed in a waiting state and then the call request message is received from the first terminal 110, the SIP server 200 transmits the call request message to the third terminal 130. When the call transfer message has been received from the first terminal 110 before the call response message is received from the third terminal 130, the SIP server 200 transmits a call re-request message to the third terminal 130. Upon receipt of a call termination request message in response to the call request message from the third terminal, the SIP server 200 terminates the call requested by the first terminal 110 and then performs the blind transfer with the third terminal 130.

Furthermore, when receiving the call request message from the first terminal 110 and then receiving the call transfer message of the first terminal 110 via the SIP server 200, the third terminal 130 transmits the call termination request message to the SIP server 200 in response to the call request message from the first terminal 110, and transmits a response message to the call transfer message of the first terminal 110 to the SIP server 200 in order to perform the blind transfer.

The call waiting function and the call transfer function are performed by the same processor or respective independent processors.

A description of general functions and operations of the respective units has been omitted, and only their operations corresponding to the present invention have been described.

First, an operation of tryout for call transfer to the third terminal 130 is described when the first terminal 110 and the second terminal 120 are communicating using an established call through the SIP server 200.

When a call waiting function is activated, the first terminal 110, establishing a call with the second terminal 120, transmits a call waiting message (Re-INVITE) to the SIP server 200. The activation of the call waiting function means one of a hook switch or another button on the first terminal.

The SIP server 200 transmits the call waiting message (Re-INVITE) from the first terminal 110 to the second terminal 120.

In response to the call waiting message, the second terminal 120 transmits a success message (200OK) to the SIP server 200, and the SIP server 200 transmits the success message (200OK) to the first terminal 110.

Upon receipt of the success message (200OK) from the SIP server, the first terminal 110 transmits an ACK message to the SIP server 200 and simultaneously terminates communication. The SIP server 200 terminates the call waiting procedure for the second terminal 120 by transmitting the received ACK message to the second terminal 120.

Thereafter, when a user of the first terminal 110 inputs a phone number of the third terminal 130 using a keypad (not shown), the first terminal 110 performs a call establishing procedure by transmitting a call request message (INVITE) including the phone number of the third terminal 130 to the SIP server 200.

Then, the SIP server 200 transmits the call request message from the first terminal 110 to the third terminal 130.

Upon receipt of the call request message (INVITE) from the SIP server 200, the third terminal 130 generates a ring-tone until the user hooks off and simultaneously transmits a RING message to the SIP server 200.

The first terminal 110 determines whether the call transfer function has been activated by the user. The activation of the call transfer function generally means Hook On or pressing another button.

If the call transfer function has been activated before the success message (200OK) is received from the SIP server 200, the first terminal 110 transmits a call transfer message (REFER to the third terminal) to the SIP server 200.

The SIP server 200 then transmits the call transfer message (REFER) from the first terminal 110 to the third terminal 130.

Upon receipt of the call transfer message (REFER) from the SIP server 200, the third terminal 130 transmits a call termination request message (REQ TERM) to the SIP server 200 to terminate the call request message (INVITE) from the first terminal 110.

Then, the SIP server 200 transmits the call termination request message (REQ TERM) from the third terminal 130 to the first terminal 110. The first terminal 110 transmits the success message (200K) to the SIP server 200 and the SIP server 200 transmits the success message (200K) to the third terminal 130. The third terminal 130 then generates a ring-tone in response to the call transfer message from the first terminal 110.

Thereafter, when a user of the third terminal 130 hooks off, the third terminal 130 transmits the success message (200OK) to the SIP server 200 in response to the call transfer message, and the SIP server 200 transmits a call re-request message (INVITE<REPLACE>) to the second terminal 120.

Subsequently, if the SIP server 200 receives the success message (200OK) from the second terminal 120, it terminates the blind transfer by transmitting an ACK message to the second terminal 120 and the third terminal 130.

Furthermore, the third terminal 130, which receives the call request message (INVITE) from the SIP server 200, generates a ring-tone until the user hooks off, and simultaneously transmits a RING message to the SIP server 200.

If the call transfer function has been activated by the user of the first terminal 110, after the first terminal 110 establishes a call with the third terminal 130 by the third terminal 130 transmitting the success message (200OK), the first terminal 110 transmits the call waiting message (Re-INVITE) for pausing the third terminal 130 to the SIP server 200. The activation of the call transfer function generally means Hook On, or pressing another button.

Then, the SIP server 200 transmits the call waiting message (Re-INVITE) from the first terminal (100) to the third terminal 130.

Thereafter, the third terminal 130 transmits the success message (200OK) to the SIP server 200, and the SIP server 200 transmits the success message (200OK) to the first terminal 110.

Subsequently, the first terminal 110 transmits the call transfer message (REFER to the third terminal 130) to the SIP server 200.

Then, the SIP server 200 transmits the success message (202 ACCEPTED) to the first terminal 110 and provides the status message to the first terminal 110.

Thereafter, the first terminal 110 transmits the success message (200OK) to the SIP server 200 and transmits the terminating message (BYE) to the SIP server.

Then, the SIP server 200 transmits the call re-request message (INVITE<REPLACE>) to the second terminal 120 and the third terminal 130 and, if a success message (200OK) has been received from both the second terminal 120 and the third terminal 130, terminates the attended transfer with the third terminal 130 by transmitting an ACK message to the second terminal 120 and the third terminal 130.

The SIP server terminates the call with the first terminal 110 by transmitting the terminating message (BYE) to the first terminal 110 when it receives the success message (200OK) corresponding to the call re-request message from the third terminal 130.

FIG. 3 is a block diagram of a system for blind/attended transfer in an SIP-based network of an embodiment of the present invention. The first terminal 110 includes a call controller 101, a call-transfer determiner 102, and a call-transfer processor 103. The third terminal 130 includes an error-call processor 104.

When a call waiting function has been activated by a user, the call controller 101 transmits a call request message to a third terminal 130, which is a transfer object, after pausing a call with a second terminal 120 by transmitting a call waiting message to the SIP server 200.

The call-transfer determiner 102 determines whether a call transfer function (Hook on) has been activated prior to receiving a call response message (200OK) from the SIP server 200.

When the call-transfer determiner 102 determines that the call transfer function has been activated prior to receiving the call response message from the SIP server 200, the call-transfer processor 103 performs the blind transfer with the third terminal 130, by transmitting a call-transfer request message (REFER) to the SIP server 200 for the blind transfer to the third terminal 130. When the call response message has been received from the SIP server 200, a call is established, and then the call transfer message is received, the call-transfer processor 103 transmits a call waiting message to the SIP server 200 and retransmits the call request message to the second terminal 120 and the third terminal 130 to perform the attended call transfer to the third terminal 130.

When the call transfer message has been received prior to transmitting the call response message, the call-transfer processor 103 terminates a call, generated by the first call request message, by transmitting a call-termination request message corresponding to the first call request message, and simultaneously the error-call processor 104 generates a ring-tone for the call transfer message.

The call waiting function and the call transfer function are performed by the same processor or respective independent processors.

Figure 4:
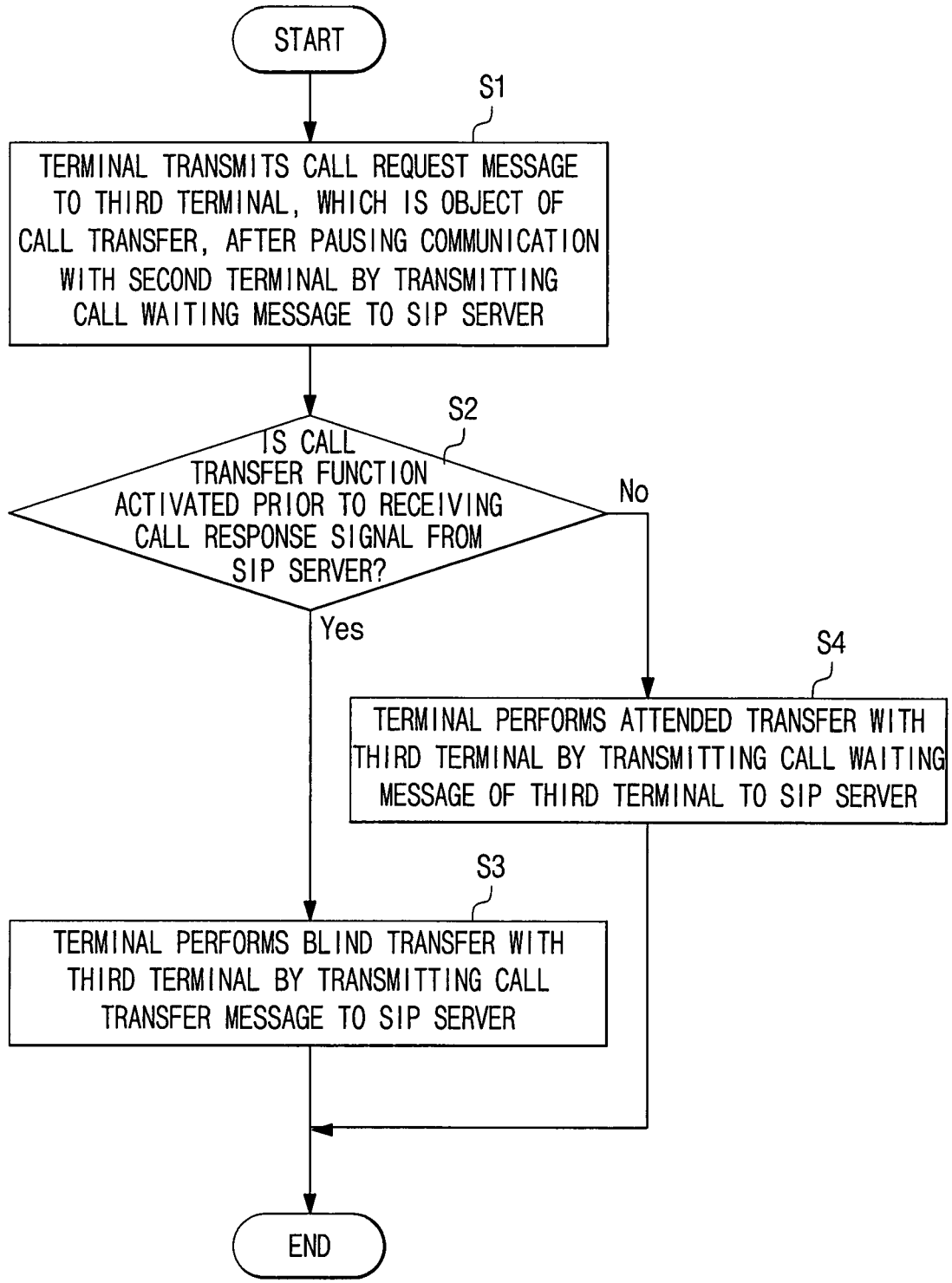
FIG. 4 is a flowchart of a method of controlling a blind/attended transfer of a terminal in an SIP-based network of an embodiment of the present invention.

A method of controlling a blind/attended transfer in an SIP-based network having the above configuration according to an embodiment of the present invention is described below with reference to FIG. 4.

First, a terminal transmits a call request message to a third terminal 130, which is an object of a call transfer, after pausing a communication with a second terminal 120 by transmitting a call waiting message to the SIP server 200 (S1).

The terminal then determines whether a call transfer function (Hook on) has been activated prior to receiving a call response (200OK) signal from the SIP server (S2).

When the call transfer function (Hook on) has been activated prior to receiving the call response message from the SIP server 200 (YES), the terminal performs a blind transfer with the third terminal 130 by transmitting a call transfer message (REFER) to the SIP server 200 (S3).

On the other hand, when the call transfer function (Hook on) has been activated after the call response message has been received from the SIP server 200 and the call has been established (NO), the terminal performs an attended transfer with the third terminal 130 by transmitting the call waiting message of the third terminal 130 to the SIP server 200 (S4).

Figure 5:
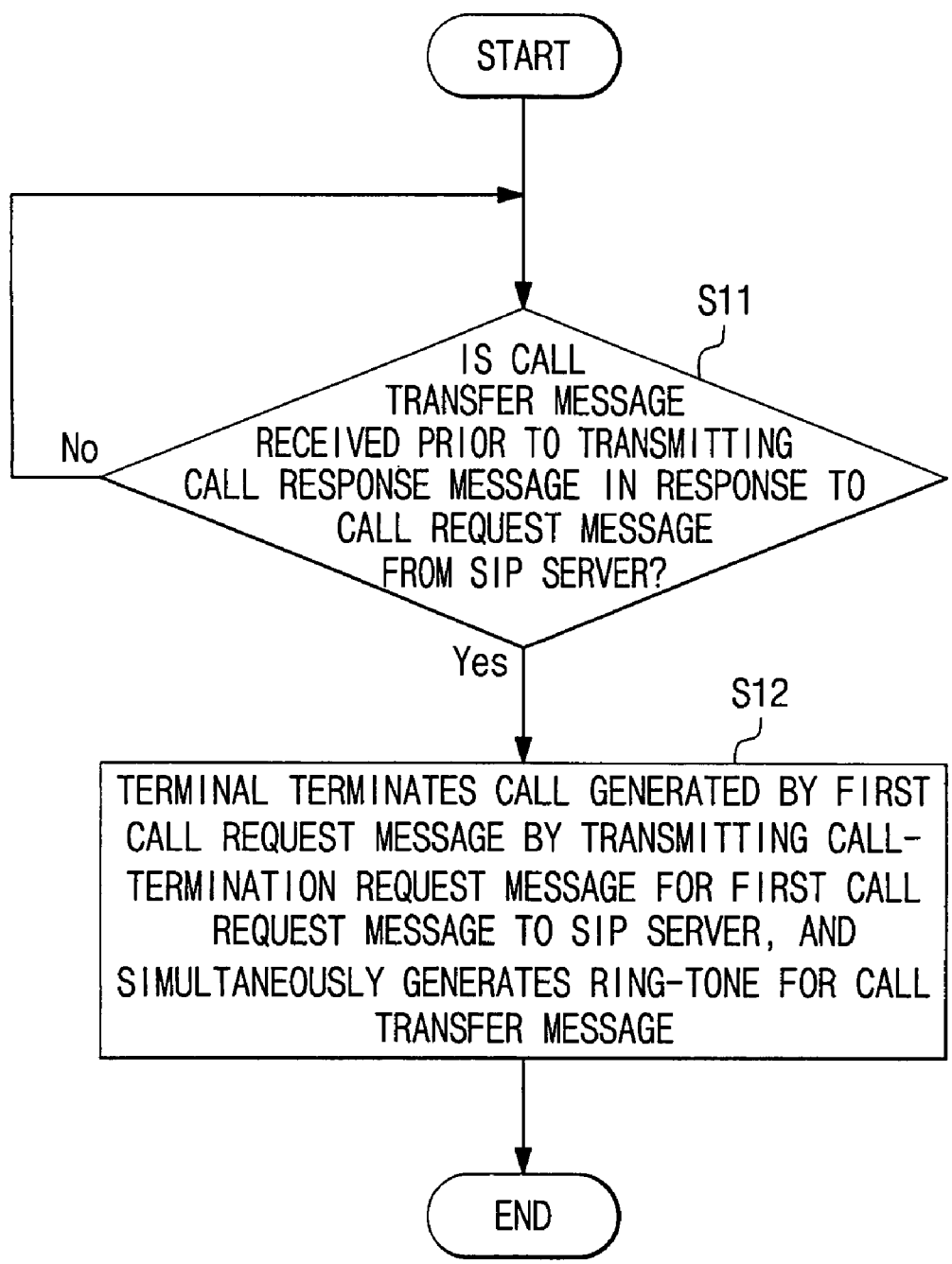
FIG. 5 is a flowchart of a message processing method of a terminal in an SIP-based network of an embodiment of the present invention.

A method of controlling a blind/attended transfer in an SIP-based network having the above configuration according to an embodiment of the present invention is described below with reference to FIG. 5.

A terminal determines whether a call transfer message has been received prior to transmitting a call response message in response to a call request message from the SIP server 200 (S11).

When the call transfer message has been received prior to transmitting the call response message (S11) (YES), the terminal terminates a call generated by the first call request message by transmitting a call-termination request message for the first call request message to the SIP server 200, and simultaneously generates a ring-tone for the call transfer message (S12).

Figure 6:
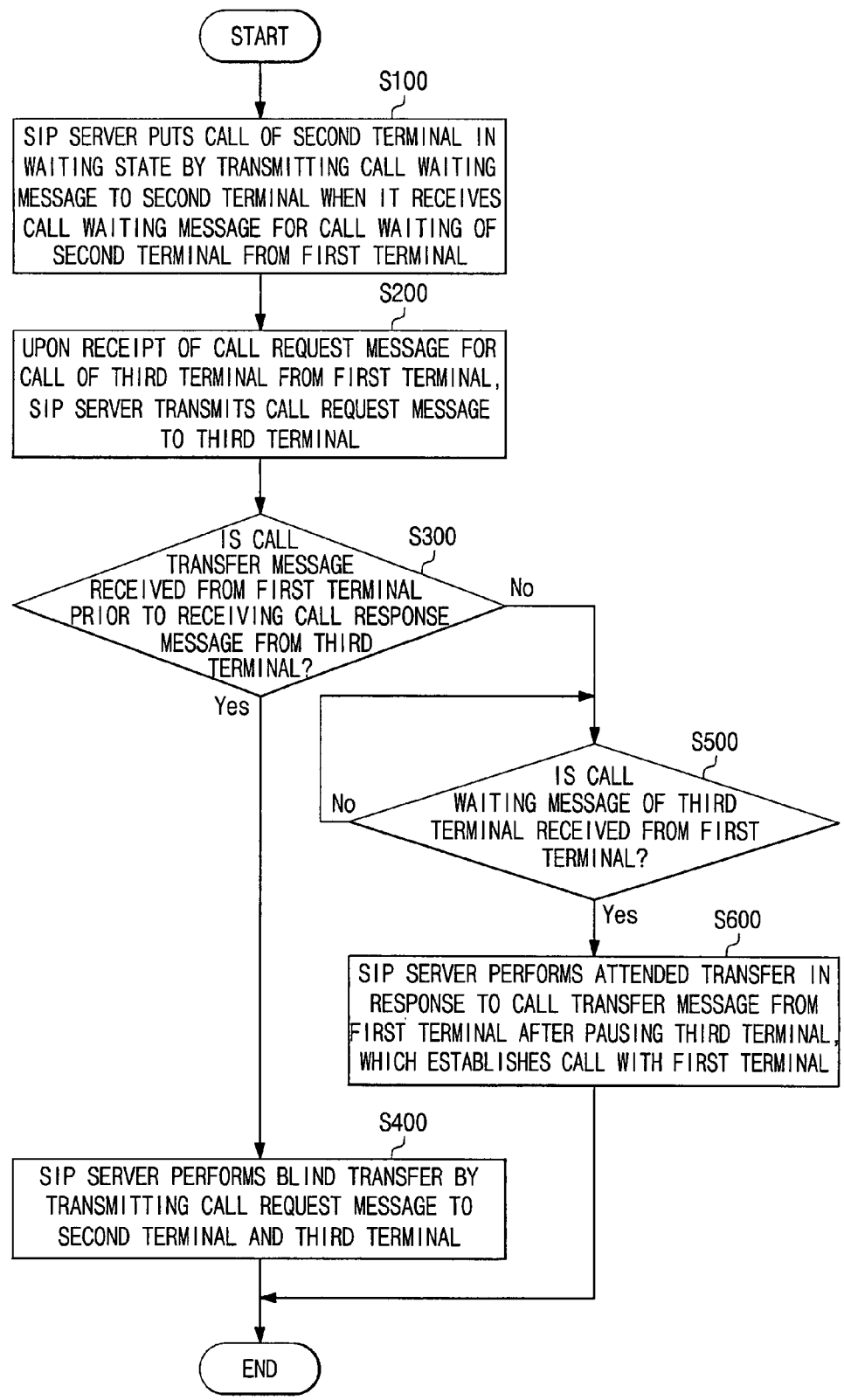
FIG. 6 is a flowchart of a method of controlling a blind/attended transfer of an SIP server in an SIP-based network of an embodiment of the present invention.

A method of controlling a blind/attended transfer in an SIP-based network having the above configuration according to an embodiment of the present invention is described below with reference to FIG. 6.

The SIP server 200 places a call of a second terminal 120 in a waiting state by transmitting a call waiting message to the second terminal 120 when it receives the call waiting message for call waiting of the second terminal 120 from the first terminal 110 (S100).

Upon receipt of the call request message for a call of the third terminal 130 from the first terminal 110, the SIP server 200 transmits the call request message to the third terminal 130 (S200).

Then, the SIP server 200 determines whether the call transfer message has been received from the first terminal 110 prior to receiving the call response message from the third terminal 130 (S300).

When the call waiting message has been received (YES), the SIP server 200 performs a blind transfer by transmitting the call request message to the second terminal 120 and the third terminal 130 (S400).

The step-where the SIP server 200 performs a blind transfer by transmitting the call request message to the second terminal 120 and the third terminal 130 is described in detail below with reference to FIG. 7.

First, the SIP server 200 transmits the call transfer message received from the first terminal 110 to the third terminal (S410).

Upon receipt of the call-termination request message from the third terminal 130 in response to the first call request message from the first terminal 110, the SIP server 200 transmits a response message to the third terminal 130 in response to the call-termination request message (S420).

Thereafter, when a response message in response to the call transfer message has been received from the third terminal 130, the SIP server 200 performs the blind transfer between the second terminal 120 and the third terminal 130 by retransmitting a call request signal to the second terminal 120 (S430).

When the call transfer message has not been received (NO), the SIP server 200 determines whether the call waiting message of the third terminal 130 has been received from the first terminal 110 after establishing a call between the first terminal 110 and the third terminal 130 in response to the call response message from the third terminal 130 (S500).

When the call waiting message of the third terminal 130 has been received (YES), the SIP server 200 performs the attended transfer in response to the call transfer message from the first terminal 110 after pausing the third terminal 130, which establishes a call with the first terminal 110 (S600).

As described above, with the system and method of controlling a blind/attended transfer in an SIP-based network according to the present invention, an SIP-based terminal processes the blind/attended transfer using one input, thereby providing convenience to a user.

While the present invention has been described with reference to exemplary embodiments thereof, it will be understood by those skilled in the art that various modifications in form and detail may be made therein without departing from the scope of the present invention, as defined by the following claims.

What is claimed is:

1. A method of controlling a blind/attended transfer, the method comprising:
   transmitting a call request message from a first terminal to a third terminal in response to pausing a communication with a second terminal by transmitting a call waiting message to a Session Initiation Protocol (SIP) server, the call request message being an object of the call transfer;
   determining whether a call transfer function is activated prior to receiving a call response signal from the SIP server, the determination being made by the first terminal; and
   performing the blind transfer with the third terminal by transmitting a call transfer message to the SIP server upon the call transfer function being activated prior to receiving the call response message from the SIP server, the blind transfer being performed by the first terminal.

2. The method of claim 1, further comprising:
   performing the attended transfer with the third terminal by transmitting the call waiting message of the third terminal to the SIP server, the attended transfer being performed by the first terminal upon the call transfer function being activated in response to establishing a call in response to the call response message from the SIP server.

3. The method of claim 1, further comprising:
   determining whether the call transfer message has been received after receiving the call request message from the SIP server and before transmitting the call response message, the determination being made by the first terminal; and terminating a call established by a first call request message by transmitting a call-termination request message associated with the first call request message to the SIP server, and simultaneously generating a ring-tone in response to the call transfer message upon the call transfer message being received prior to transmitting the call response message, the terminating being performed by the first terminal.

4. A method of controlling call transfer to a terminal, the method comprising:
   pausing a call of a second terminal by transmitting a call waiting message to the second terminal upon the call waiting message for pausing a call of the second terminal being received from a first terminal, the pausing being performed by a Session Initiation Protocol (SIP) server;
   transmitting a call request message to a third terminal upon the call request message for a call of the third terminal being received from the first terminal, the transmitting being performed by the SIP server;
   determining whether a call transfer message has been received from the first terminal prior to receiving a call response message from the third terminal, the determining being performed by the SIP server; and
   performing the blind transfer by transmitting the call request message to the second terminal and the third terminal upon the call transfer message being received from the first terminal prior to receiving the call response message from the third terminal, the blind transfer being performed by the SIP server.

5. The method of claim 4, further comprising:
   upon the call transfer message not being received from the first terminal prior to receiving the call response message from the third terminal, determining whether the call waiting message of the third terminal has been received from the first terminal in response to establishing the call of the third terminal with the first terminal and to receiving the call response message from the third terminal, the determining being performed by the SIP server; and
   performing the attended transfer in response to receiving the call transfer message from the first terminal, the attended transfer being performed by the SIP server.

6. The method of claim 4, wherein the SIP server performing the blind transfer by transmitting the call request message to the second terminal and the third terminal comprises:
   transmitting the call transfer message received from the first terminal to the third terminal, the call transfer message being transferred by the SIP server;
   transmitting a response message to a call-termination request message to the third terminal, in response to receiving the call-termination request message, the response message being transmitted by the SIP server; and
   performing the blind transfer between the second terminal and the third terminal by retransmitting a call request signal to the second terminal upon the SIP server receiving the response message to the call transfer message from the third terminal, the blind transfer being performed by the SIP server.

7. A system to perform a blind/attended transfer, the system comprising:
   a first terminal to pause a call with a second terminal by transmitting a call waiting message to a Session Initiation Protocol (SIP) server in response to a call waiting function being activated, to transmit a call request message to the SIP server to establish a call with a third terminal, to determine whether a call transfer message is received prior to receiving a call response message associated with the call request message from the SIP server, and to perform the blind transfer with the third terminal by transmitting the call transfer message to the SIP server upon the call transfer message being received prior to receiving the call response message;

the SIP server to perform a call waiting procedure in response to transmitting the call waiting message to the second terminal upon the SIP server receiving the call waiting message from the first terminal, to transmit the call request message to the third terminal upon the SIP server receiving the call request message from the first terminal and upon pausing the call with the second terminal, to transmit a call re-request message to the third terminal upon the SIP server receiving the call transfer message from the first terminal prior to receiving the call response message from the third terminal, and to perform the blind transfer with the third terminal upon terminating the call requested by the first terminal in response to a call-termination request message; and the third terminal to transmit the call-termination request message to the SIP server in response to the call request message of the first terminal, upon the third terminal receiving the call transfer message of the first terminal, and to transmit the call response message to the SIP server in response to the call request message of the first terminal to perform the blind transfer.

8. The system of claim 7, wherein the first terminal determines whether the call transfer function has been activated upon the second terminal being placed in a waiting state and upon establishing a call with the third terminal.

9. The system of claim 7, wherein the first terminal places the second terminal in a waiting state and performs the attended transfer by transmitting a call waiting signal to the SIP server to place the third terminal in a waiting state upon the call transfer function being activated, upon the second terminal being placed in a waiting state, and upon a call with the third terminal being established.

10. The system of claim 7, wherein the call waiting function and the call transfer function are performed by the same processor.

11. The system of claim 7, wherein the call waiting function and the call transfer function are performed by respective independent processors.

12. A Session Initiation Protocol (SIP)-based terminal, comprising:

a call controller to transmit a call request message to a third terminal, in response to pausing a call with a second terminal by transmitting a call waiting message to a SIP server upon a call waiting function being activated;

a call-transfer determiner to determine whether a call transfer function is activated prior to receiving a call response message from the SIP server; and a call-transfer processor to perform a blind transfer with the third terminal by transmitting a call-transfer request message to the SIP server, in response to the call transfer function being activated prior to receiving a call response message from the SIP server.

13. The terminal of claim 12, wherein the call-transfer processor transmits the call waiting message to the SIP server to perform an attended transfer to the third terminal, upon the call transfer message being received in response to a call being established and in response to receiving the call response message from the SIP server, and to retransmit the call request message to the second terminal and the third terminal to perform the attended transfer.

14. The terminal of claim 12, wherein the call-transfer processor terminates a call generated by the first call request message by transmitting a call-termination request message in response to the first call request message, upon the call transfer message being received prior to transmitting the call response message.

15. The terminal of claim 12, wherein the call waiting function and the call transfer function are performed by the same processor.

16. The terminal of claim 12, wherein the call waiting function and the call transfer function are performed by respective independent processors.

* * * * *